US008626283B1

(12) United States Patent
Zhou

(10) Patent No.: US 8,626,283 B1
(45) Date of Patent: Jan. 7, 2014

(54) ELECTRONIC DEVICE AND METHOD FOR PROVIDING TACTILE STIMULATION

(71) Applicants: Fu Tai Hua Industry (Shenzhen) Co., Ltd., Shenzhen (CN); Hon Hai Precision Industry Co., Ltd., New Taipei (TW)

(72) Inventor: Shang-Qing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/729,064

(22) Filed: Dec. 28, 2012

(30) Foreign Application Priority Data

Dec. 18, 2012 (CN) .......................... 2012 1 0549851

(51) Int. Cl.
*A61N 1/08* (2006.01)

(52) U.S. Cl.
USPC ................................. 607/3; 600/548; 128/907

(58) Field of Classification Search
USPC ................................. 607/3; 600/548; 128/907
See application file for complete search history.

(56) References Cited

U.S. PATENT DOCUMENTS

| 4,016,870 | A  | * | 4/1977  | Lock .............................. | 600/548 |
| 7,489,973 | B2 | * | 2/2009  | Shah .............................. | 607/149 |
| 8,050,776 | B2 | * | 11/2011 | Shah .............................. | 607/149 |
| 8,355,790 | B2 | * | 1/2013  | Naroditsky et al. ............. | 607/46  |

\* cited by examiner

*Primary Examiner* — Michael Kahelin
(74) *Attorney, Agent, or Firm* — Altis Law Group, Inc.

(57) ABSTRACT

A method for providing tactile stimulation is applied in an electronic device. The electronic device includes a touch-sensitive screen and a tactile stimulation multilayer connected to the touch-sensitive screen. The tactile stimulation multilayer includes a number of electrodes. The method includes the steps of: providing a first user interface on the touch-sensitive screen for a user to select one body part for massage, and providing a second user interface for the user to select at least one acupuncture point of the selected body part; displaying a model of the selected body part and the selected acupuncture point thereof; according to the detected outline, adjusting a position of the selected acupuncture point to match the outline of the body part actually touching the screen; and energizing at least one electrode.

10 Claims, 8 Drawing Sheets

US 8,626,283 B1

ELECTRONIC DEVICE AND METHOD FOR PROVIDING TACTILE STIMULATION

BACKGROUND

1. Technical Field

The present disclosure relates to electronic devices, and particularly, to an electronic device and a method for providing tactile stimulation adapted for the electronic device.

2. Description of Related Art

Many electronic devices, such as mobile phones, tablet computers, and multimedia players, employ touch-sensitive screens as input interfaces. When a user presses one virtual button or icon displayed on a touch-sensitive screen, the button or icon does not provide tactile feedback to the user, as a conventional keyboard does, which has a greater key-travel distance for a keystroke when operated.

In order to improve the user experience, a number of vibrating mechanical members are arranged under the touch-sensitive screen. When sensing a touch operation on the touch-sensitive screen, the vibrating mechanical member at the point of touch begins to vibrate to provide tactile feedback to the user. The technology of enabling the touch-sensitive screen to provide tactile feedback is realized by delivering an electrosensory sensation in response to a touch operation on the touch-sensitive screen. However, there are almost no developments on how the vibration-based tactile feedback or the electrosensory tactile feedback can be applied with a touch-sensitive screen to allow the electronic device to perform massaging functions.

Therefore, what is needed is a means to solve the problem described above.

BRIEF DESCRIPTION OF THE DRAWINGS

Many aspects of the present disclosure can be better understood with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
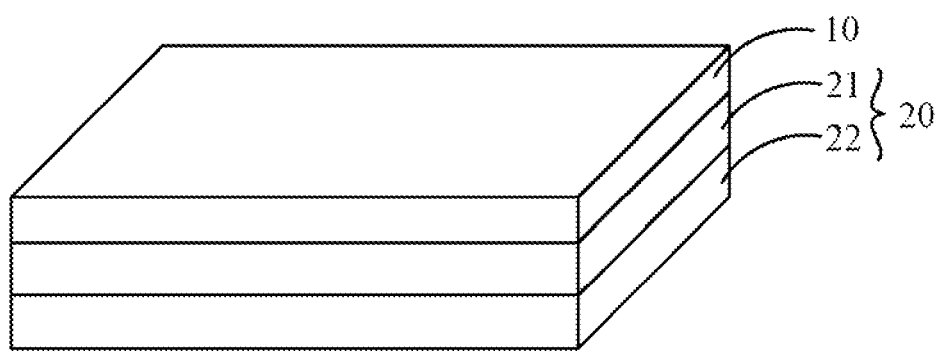
FIG. 1 is a perspective view of a touch-sensitive screen included in an electronic device, in accordance with an exemplary embodiment.

FIG. 1 is a perspective view of a touch-sensitive screen 10 of an electronic device 100 according to an exemplary embodiment. The electronic device 100 may be a mobile phone, a tablet computer, or a multimedia player for example. A tactile stimulation multilayer 20 is connected to the screen 10, and is arranged above or under the screen 10. The multilayer 20 includes a number of electrodes 220 (further shown in FIG. 3) which can be independently controlled. The electronic device 100 further includes a storage unit 30 and a processor 40 (further shown in FIG. 3). The storage unit 30 stores at least one model of a human body part, for example a palm model, and a first position relationship between each model and acupuncture points of the model. The storage unit 30 further stores a second position relationship between a number of positions of the screen 10 and the electrodes 220. Each position corresponds to one electrode 220. The storage unit 30 further stores a tactile stimulation system 1. The system 1 includes a variety of modules executed by the processor 40 to provide the functions of the system 1. In this embodiment, the system 1 is executed by the processor 40 to energize the electrodes 220 in the multilayer 20 corresponding to at least one selected acupuncture point to provide a tactile stimulation to a body member touching the screen 10.

Figure 2:
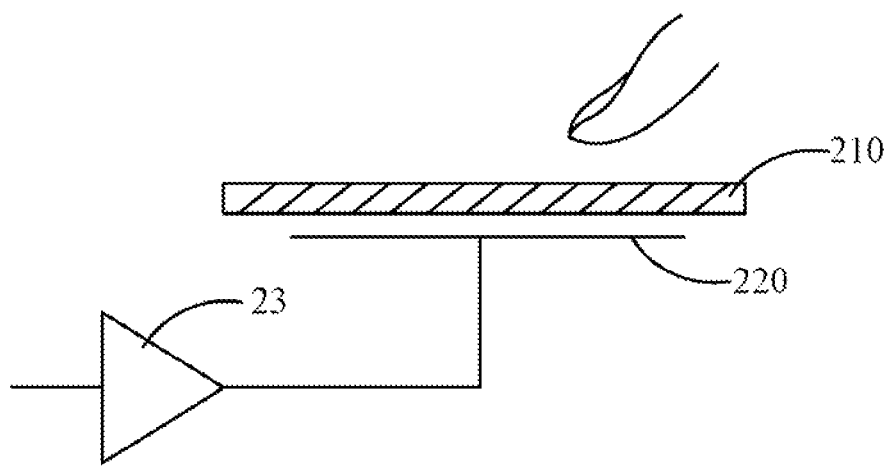
FIG. 2 is a perspective view of a tactile stimulation multilayer connected to the touch-sensitive screen of FIG. 1, in accordance with an exemplary embodiment.

FIG. 2 shows that the multilayer 20 includes an insulation layer 21 and an electrode layer 22. The electrodes 220 are included in the electrode layer 22. The electrodes 220 are connected to a power supply unit 23, and can be independently energized via the power supply unit 23. The insulation layer 21 includes a number of insulators 210, and each insulator 210 corresponds to one electrode 220. In the embodiment, the multilayer 20 is arranged under the screen 10, and the insulation layer 21 is arranged between the multilayer 20 and the electrode layer 22. Furthermore, when a body member, which is a relatively good insulator when dry, touches the multilayer 20, the body member and the multilayer 20 cooperatively form a capacitor. When the system 1 energizes the corresponding electrodes 220 via the power supply unit 23, static electrical charges flow to the body member because of a capacitive coupling between the energized electrode 220 and the body member, and a tactile stimulation is delivered to the body member.

Figure 3:
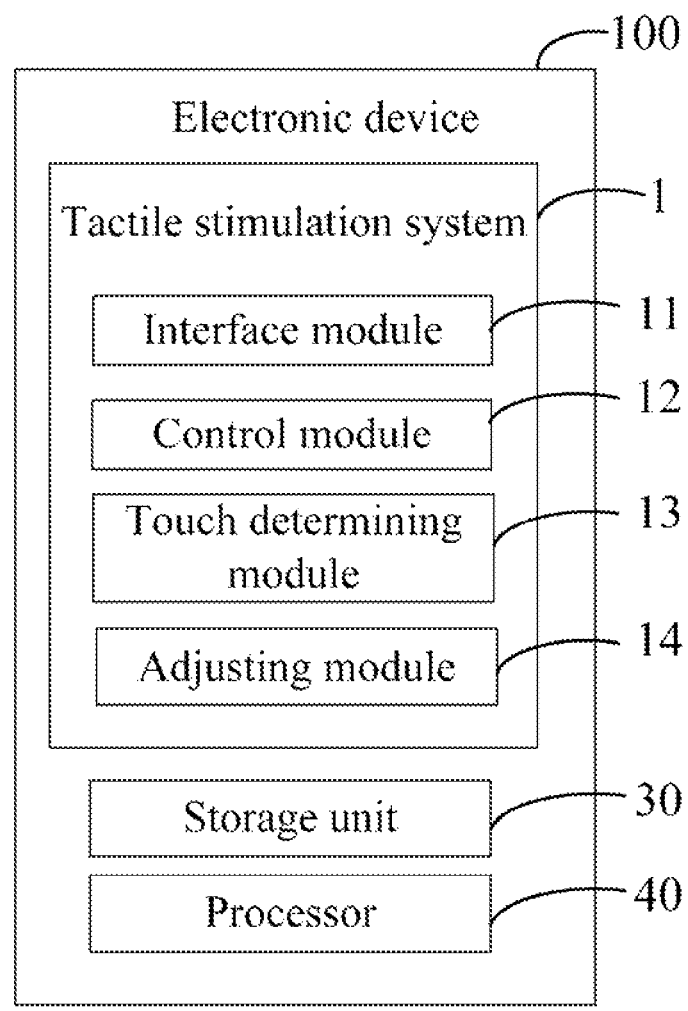
FIG. 3 is a block diagram of a tactile stimulation system applied to the electronic device of FIG. 1, in accordance with an exemplary embodiment.

FIG. 3 shows that in the embodiment, the system 1 includes an interface module 11, a control module 12, a touch determining module 13, and an adjusting module 14.

Figure 4:
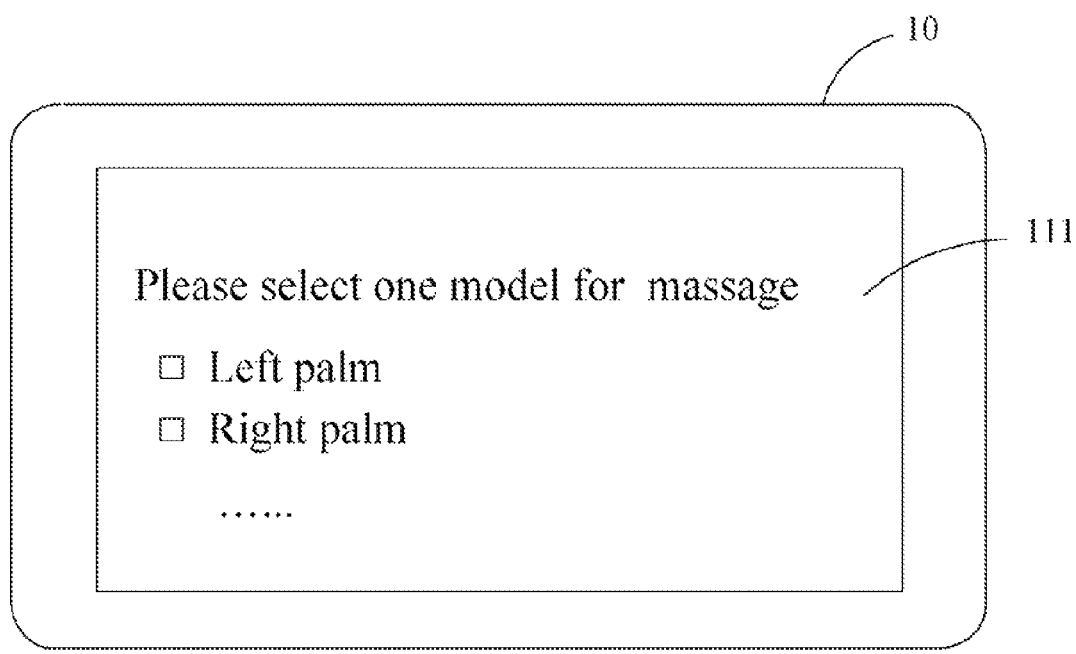
FIG. 4 is a schematic view of a first user interface provided by the tactile stimulation system of FIG. 3, showing how to select a body member for massage, in accordance with an exemplary embodiment.

The interface module 11 provides a first user interface 111 (see FIG. 4) on the screen 10. The first user interface 111 includes a variety of model options for a user to select one model for massage. When one model is selected, the interface module 11 further provides a second user interface 112 (see FIG. 5) on the screen 10. The second user interface 111 includes a variety of acupuncture point options for the user to select at least one acupuncture point of the selected model.

Figure 5:
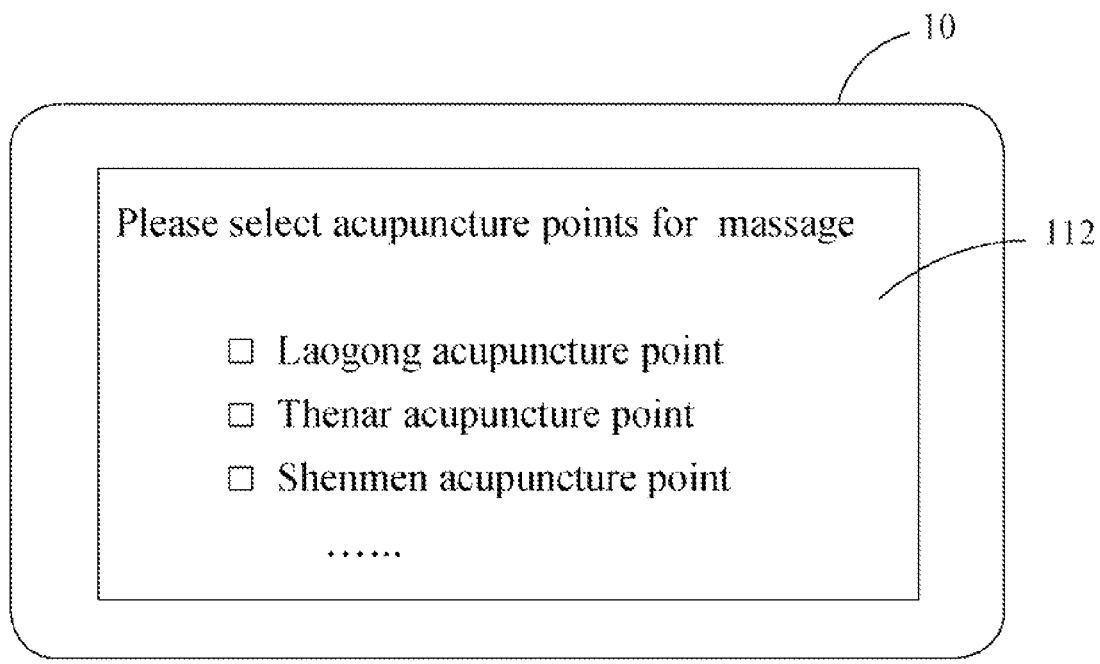
FIG. 5 is a schematic view of a second user interface provided by the tactile stimulation system of FIG. 3, showing how to select acupuncture points for massage, in accordance with an exemplary embodiment.
Figure 6:
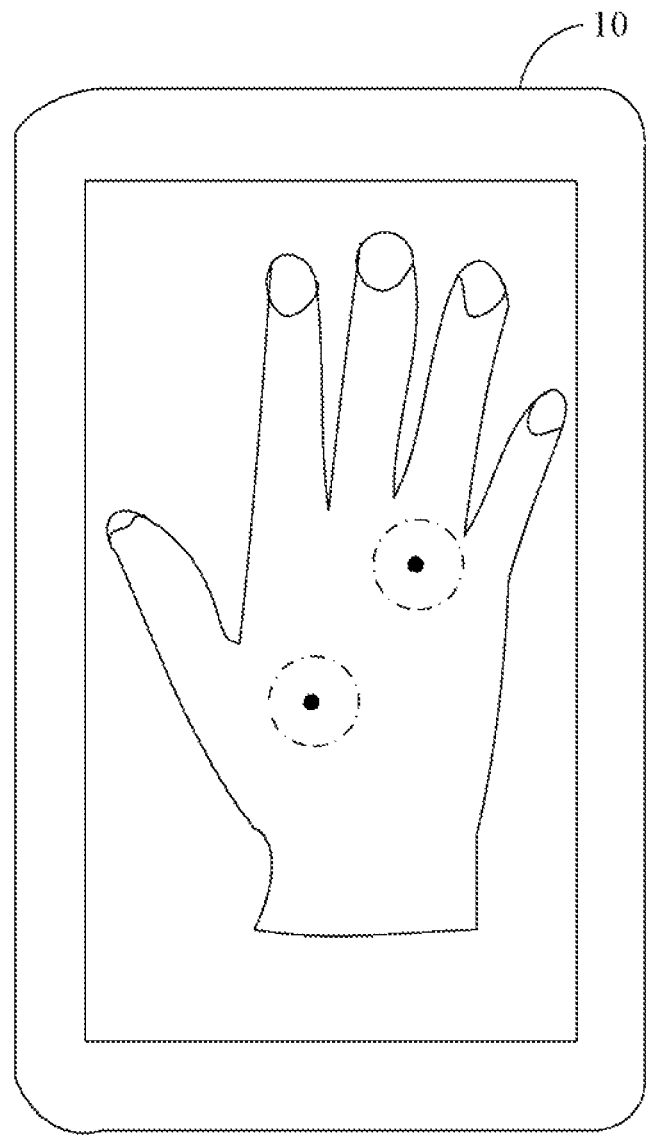
FIG. 6 is a schematic view showing a selected body member and selected acupuncture points in the body member displayed on the touch-sensitive screen of FIG. 1, in accordance with an exemplary embodiment.

The control module 12 displays the selected model and the selected acupuncture point of the selected model according to the first position relationship (see FIG. 5).

The touch determining module 13 determines whether the displayed model is touched by a body member according to signals from the screen 10. If yes, the touch determining module 13 further determines an outline of the body member touching the displayed model, and determines whether the determined outline of the body member is the same type as in the displayed model. For example, if the displayed model is a palm of a left hand, and the body member touching the displayed model is also a palm of a left hand, the touching determining module 15 determines that the outline of the body member touching the displayed model is the same type as in the displayed model.

The adjusting module 14 determines any difference between the determined outline and the displayed model if the determined outline of the body member is the same type as in the displayed model, and adjusts the position of the selected acupuncture point according to such difference, to make sure that the selected acupuncture point corresponds to the actual acupuncture point of the body member touching the screen 10.

Figure 7:
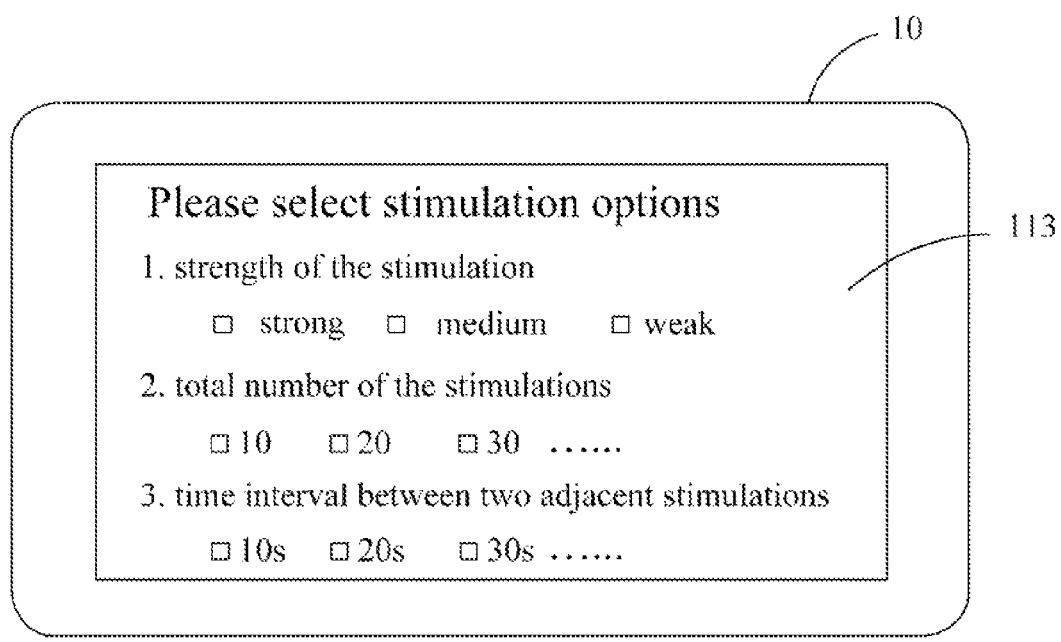
FIG. 7 is a schematic view of a third user interface provided by the tactile stimulation system of FIG. 3, showing how to select stimulation options for energizing electrodes of FIG. 2, in accordance with an exemplary embodiment.

The control module 12 further determines at least one electrode 220 corresponding to the position of the selected acupuncture point (adjusted if required) according to the second position relationship between the positions and the electrodes 220, and energizes the determined electrode 220 via the power supply unit 23. Thus, tactile stimulation is provided to the selected acupuncture point of the body member touching the screen 10, and a massage is provided. In this embodiment, the interface module 11 provides a third user interface 113 (see FIG. 7) on the screen 10 for a user to select stimulation options for energizing the electrodes 220, and the control module energizes the determined electrode 220 via the power supply unit 23 according to the selected stimulation options. In the embodiment, the stimulation options include the strength of the stimulation, the total number of the stimulations, and the time interval between each two adjacent stimulations. Different strengths of the tactile stimulation are realized by altering the amplitude or wave frequency of electrical current energizing the electrodes 220. In an alternative embodiment, the control module 12 may energize the determined electrode 220 according to default stimulation options, that is, the strength of the stimulation, the total number of the stimulations, and the time interval between each two adjacent stimulations are preset.

Figure 8:
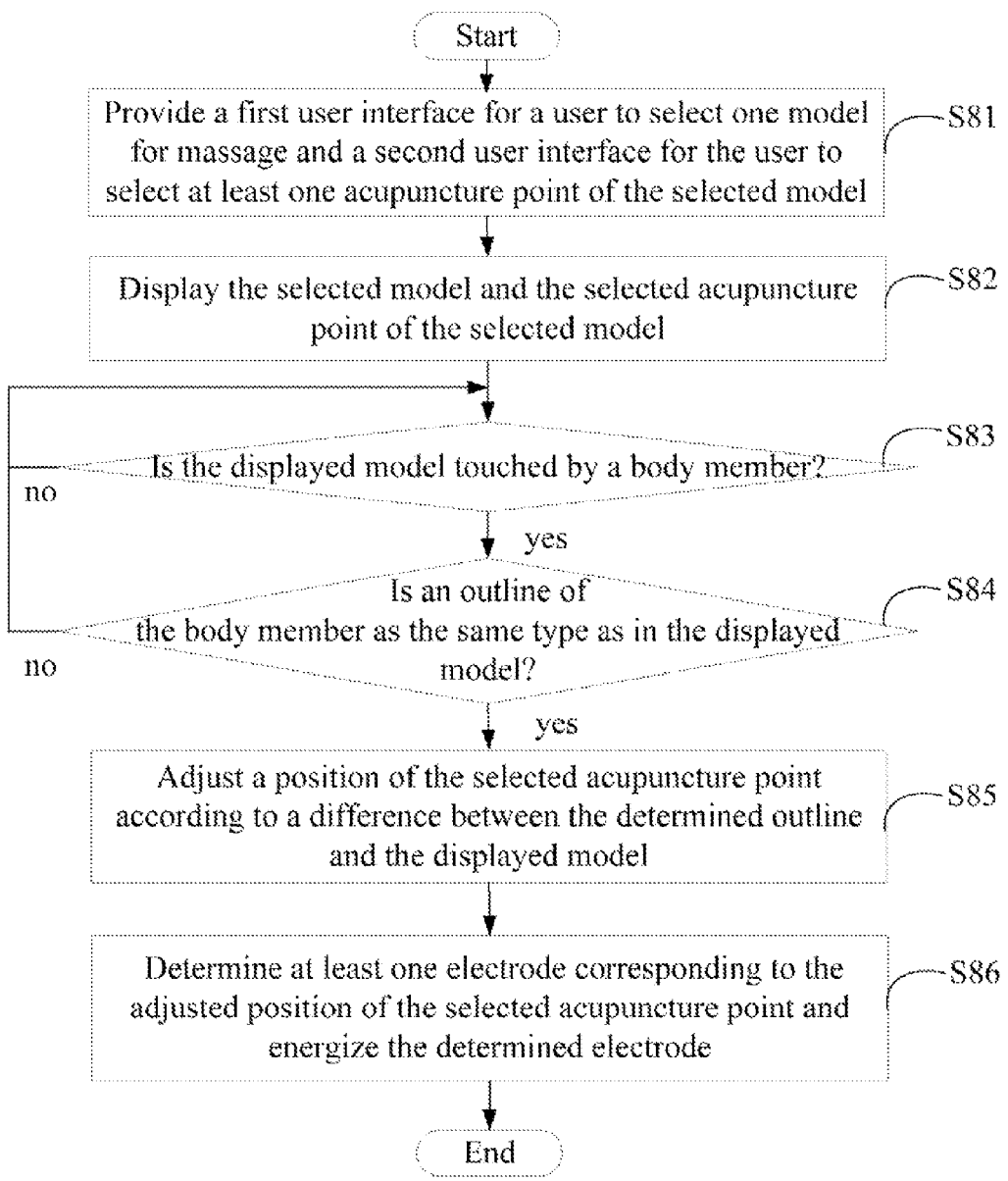
FIG. 8 is a flowchart of a method for providing tactile stimulation, in accordance with an exemplary embodiment.

FIG. 8 is a flowchart of a method for providing tactile stimulation, in accordance with an exemplary embodiment.

In step S81, the interface module 11 provides a first user interface 111 on the screen 10 for a user to select one model of a human body part for massage and then provides a second user interface 112 on the screen 10 when one model is selected, for the user to select at least one acupuncture point of the selected model of the body part which the user wants to be massaged.

In step S82, the control module 12 displays the selected model and the selected acupuncture points of the selected model according to the first position relationship.

In step S83, the touch determining module 13 determines whether the displayed model is touched by a body member according to signals from the screen 10, if any touch occurs (yes), the procedure goes to step S84; otherwise, the procedure goes back to step S83.

In step S84, the touch determining module 13 determines an outline of the body member actually touching the displayed model and then determines whether the determined outline of the body member is the same type as in the displayed model, if yes, the procedure goes to step S85; otherwise, the procedure goes back to step S83.

In step S85, the adjusting module 14 determines any difference between the determined outline and the model displayed, and adjusts the position of the selected acupuncture point according to any difference to make sure that the selected acupuncture point corresponds to the actual acupuncture point of the body member touching the screen 10.

In step S86, the control module 12 determines at least one electrode 220 corresponding to the position of the selected acupuncture point (adjusted if required) according to the second position relationship between the positions and the electrodes 220, and energizes the determined electrodes 220 via the power supply unit 23. In this embodiment, the control module 12 energizes the determined electrode 220 via the power supply unit 23 according to stimulation options selected by the user through a third user interface 113. The stimulation options includes the strength of the stimulation, the total number of stimulations, the time interval between each two adjacent stimulations. The different ways in which the determined electrode 220 can be energized are realized by altering the amplitude or wave frequency of electrical current energizing the electrodes 220.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   a touch-sensitive screen;
   a tactile stimulation multilayer connected to the touch-sensitive screen, the tactile stimulation multilayer comprising a plurality of electrodes;
   a storage unit storing a plurality of modules, a first position relationship between at least one model of a human body part and acupuncture points of each model, and a second position relationship between a plurality of positions of the touch-sensitive screen and the electrodes, each position corresponding to one of the electrodes; and
   a processor configured to execute a plurality of modules, and the plurality of modules comprising an interface module, a control module, a touch determining module, and an adjusting module;
   wherein the interface module is configured to provide a first user interface on the touch-sensitive screen for a user to select one model for massage, and further provide a second user interface for the user to select at least one acupuncture point of the selected model;
   the control module is configured to display the selected model and the selected acupuncture point of the selected model according to the first position relationship;
   the touch determining module is configured to determine whether the displayed model is touched by a body member according to signals from the touch-sensitive screen, determine an outline of the body member touching the displayed model if the displayed model is touched, and determine whether the determined outline of the body member is the same type as in the displayed model;
   the adjusting module is configured to determine any difference between the determined outline and the displayed model if the determined outline of the body member is the same type as in the displayed model, and adjust a position of the selected acupuncture point according to the difference; and
   the control module is further configured to determine at least one electrode corresponding to the adjusted position of the selected acupuncture point according to the second position relationship and energize the determined electrodes via a power supply unit.

2. The electronic device of claim 1, wherein the interface module is further configured to provide a third user interface on the touch-sensitive screen for the user to select stimulation options for energizing the determined electrode, and the control module is further configured to energize the determined electrode via the power supply unit according to the selected stimulation options.

3. The electronic device of claim 2, wherein the stimulation options comprise a strength of the stimulation, a total number of the stimulations, and a time interval between each two adjacent stimulations.

4. The electronic device of claim 3, wherein different strength of the stimulation is realized by altering an amplitude or wave frequency of electrical current energizing the electrodes.

5. The electronic device of claim 1, wherein the control module energizes the determined electrode according to default stimulation options.

6. A method for providing tactile stimulation applied in an electronic device, the electronic device comprising a touch-sensitive screen and a tactile stimulation multilayer connected to the touch-sensitive screen, the tactile stimulation multilayer comprising a plurality of electrodes, the method comprising:
   providing a first user interface on the touch-sensitive screen for a user to select one model for massage, and providing a second user interface for the user to select at least one acupuncture point of the selected model;
   displaying the selected model and the selected acupuncture point of the selected model according to a first position relationship between at least one model of a human body part and acupuncture points of each model;
   determining whether the displayed model is touched by a body member according to signals from the touch-sensitive screen;
   determining an outline of the body member touching the displayed model if the displayed model is touched, and determining whether the determined outline of the body member is the same type as in the displayed model;
   determining any difference between the determined outline and the displayed model if the determined outline of the body member is the same type as in the displayed model, and adjusting a position of the selected acupuncture point according to the difference; and
   determining at least one electrode corresponding to the adjusted position of the selected acupuncture point according to a second position relationship between a plurality of positions of the touch-sensitive screen and the electrodes and energizing the determined electrodes.

7. The method of claim 6, wherein the step determining at least one electrode corresponding to the adjusted position of the selected acupuncture point according to a second position relationship between a plurality of positions of the touch-sensitive screen and the electrodes and energizing the determined electrodes further comprises:
   providing a third user interface on the touch-sensitive screen for the user to select stimulation options for energizing the determined electrode; and
   determining at least one electrode corresponding to the adjusted position of the selected acupuncture point according to a second position relationship between a plurality of positions of the touch-sensitive screen and the electrodes and energizing the determined electrode via the power supply unit according to the selected stimulation options.

8. The method of claim 7, wherein, wherein the stimulation options comprise a strength of the stimulation, a total number of the stimulations, and a time interval between each two adjacent stimulations.

9. The method of claim 8, wherein different strength of the stimulation is realized by altering an amplitude or wave frequency of electrical current energizing the electrodes.

10. A non-transitory storage medium storing a plurality of modules, the plurality of modules comprising instructions executable by a processor of an electronic device to perform a method for providing tactile stimulation, the electronic device comprising a touch-sensitive screen and a tactile stimulation multilayer connected to the touch-sensitive screen, the tactile stimulation multilayer comprising a plurality of electrodes, the method comprising:
   providing a first user interface on the touch-sensitive screen for a user to select one model for massage, and providing a second user interface for the user to select at least one acupuncture point of the selected model;
   displaying the selected model and the selected acupuncture point of the selected model according to a first position relationship between at least one model of a human body part and acupuncture points of each model;
   determining whether the displayed model is touched by a body member according to signals from the touch-sensitive screen;
   determining an outline of the body member touching the displayed model if the displayed model is touched, and determining whether the determined outline of the body member is the same type as in the displayed model;
   determining any difference between the determined outline and the displayed model if the determined outline of the body member is the same type as in the displayed model, and adjusting a position of the selected acupuncture point according to the difference; and
   determining at least one electrode corresponding to the adjusted position of the selected acupuncture point according to a second position relationship between a plurality of positions of the touch-sensitive screen and the electrodes and energizing the determined electrodes.

* * * * *